US005848332A

United States Patent [19]

Machida

[11] Patent Number: 5,848,332

[45] Date of Patent: Dec. 8, 1998

[54] IMAGE FORMING METHOD AND APPARATUS USING TACKY IMAGE FORMING SUPPORT

[75] Inventor: Yoshinori Machida, Nakai-machi, Japan

[73] Assignee: Fuji Xerox Co., Ltd., Tokyo, Japan

[21] Appl. No.: 657,097

[22] Filed: Jun. 3, 1996

[30] Foreign Application Priority Data

Oct. 19, 1995 [JP] Japan .................................... 7-271534

[51] Int. Cl.[6] ........................... G03H 15/10; G03H 15/22

[52] U.S. Cl. ....................... 399/139; 399/318; 101/463.1; 430/49

[58] Field of Search .................................... 399/139, 318; 430/49, 126; 101/463.1, 465, 467, DIG. 37; 347/55, 151, 153, 155

[56] References Cited

U.S. PATENT DOCUMENTS

| | | | |
|---|---|---|---|
| 3,490,368 | 1/1970 | Bean | 101/DIG. 37 X |
| 4,338,386 | 7/1982 | Koizumi | 430/49 |
| 4,797,335 | 1/1989 | Hiratsuka et al. | 430/35 |
| 4,814,796 | 3/1989 | Schmidlin | 347/55 |
| 5,188,033 | 2/1993 | Fadner | 101/467 |

FOREIGN PATENT DOCUMENTS

| | | |
|---|---|---|
| 39-4299 | 4/1964 | Japan . |
| 44-9512 | 5/1969 | Japan . |
| 45-13274 | 5/1970 | Japan . |
| 49-53046 | 5/1974 | Japan . |
| A-1-209467 | 8/1989 | Japan . |

*Primary Examiner*—Joan H. Pendegrass
*Attorney, Agent, or Firm*—Oliff & Berridge, PLC

[57] ABSTRACT

The present invention relates to an image forming method for forming an image by ink, and an image forming apparatus applied to a copier, a printer and the like, which enables the use of a water ink and forms an image of high quality. The image forming method comprises a particle image forming step for forming a particle image in a deposited pattern of particles; an ink supplying step for supplying ink to the particle image to hold the ink in a void portion between the particles of the particle image; and an ink transfer step for transferring the ink supplied to the particle image to an object.

13 Claims, 7 Drawing Sheets

IMAGE FORMING METHOD AND APPARATUS USING TACKY IMAGE FORMING SUPPORT

BACKGROUND OF THE INVENTION

1. Field of the Invention

The present invention relates to an image forming method for forming an image by ink, and an image forming apparatus applied to a copier, a printer and the like.

2. Description of the Related Art

In the past, a developing method employed in an image forming apparatus is roughly divided into a dry type developing method and a wet type developing method, which are well known. In the wet type developing method, since a liquid in which extremely fine colored particles are dispersed is used as a developer, it is possible to form an image of high resolution. Further, since a natural image with less rugged portions can be obtained, it is possible to make an image higher quality.

A method generally used as the conventional wet type developing method comprises supplying a developer in which a toner comprising, for example, a resin and a coated pigment, is dispersed into an insulating carrier liquid comprising, for example, a petroleum solvent, between an electrostatic latent image carrier surface formed with an electrostatic latent image and opposed electrodes arranged in a fine spaced relation relative to the surface, placing the developer in contact with the electrostatic latent image carrier surface, and making use of electrophoresis of the toner charged in the carrier liquid to develop the electrostatic latent image.

However, the wet type developing method using a solvent insulating carrier liquid has a problem in that vapor of the petroleum solvent used as the carrier liquid is generated.

In view the above, several developing methods using a water ink have been proposed as the wet type developing method for solving the above-described problem. In the present invention, there is merely described ink including various developers and colored inks unless otherwise particularly need not be discriminated.

In a developing method using the water ink (including a water developer), when an electrostatic latent image is brought into contact with the water ink, the electrostatic latent image disappears. Therefore, in the case where an electrostatic latent image is used, there is proposed a selective developing method for selectively depositing a water ink to only an image portion. Further, as a method for performing development without using an electrostatic latent image, a wet developing method applying a difference in wettability, a two-stage developing method for preparing a rewritable plate, and the like have been proposed.

The selective developing method, the wet developing method and the two-stage developing method will be described hereinafter in said order.

The selective developing method is a developing method, as represented by Japanese Patent Publication No. Sho 44-9512 (1969), which comprises holding a developer in a concave portion of an ink applicator having an surface processed into a fine concavo-convex configuration arranged in contact with or close to an electrostatic latent image carrier, forming an electric field between the electrostatic latent image and the ink applicator, inducing a charge reversed in polarity to the electrostatic latent image in the developer by the dielectric polarization for an insulating ink or by the electrostatic induction for a conductive ink, and depositing the developer on an image portion of the electrostatic latent image by the Coulomb force.

It has been verified that this developing method has a high speed property. A high speed development equal to the normal electrophotography can be realized. Further, the construction is simple, and a smaller construction and a lower cost can be expected.

This selective developing method can be roughly divided into one for performing development by bringing an electrostatic latent image carrier into contact with a convex portion of an ink applicator (contact type), and the other for performing development under the non-contact condition (non-contact type). These have the following problems.

The contact type has problems in that a fog caused by unnecessary ink remaining in the convex portion occurs, and that ink is unnecessarily deposited on the electrostatic latent image carrier transmitted from the convex portion due to the capillarity when the ink applicator comes in contact and moves away.

Further, since the resolution is governed by the concavo-convex construction of the ink applicator, it is necessary to finely process the surface of the ink applicator, such as formation of concavo-convex portions at 10 $\mu$m, for example, in order to obtain a high resolution, this increasing the cost. Furthermore, when the surface of the ink applicator is finely processed, there poses a problem in that it is difficult to regulate a liquid surface of the concave portion of the ink applicator so that a contamination of a non-image portion tends to occur.

On the other hand, in the case of the non-contact type, since the developing property is basically greatly affected by a void between the ink applicator and the electrostatic latent image carrier, it is necessary to make the void uniform with extremely high precision, thus requiring extremely high precision of various members.

Further, a part of ink is protruded by the Coulomb force, and an induction charge is further concentrated thereon. Therefore, in a uniform solid image area, an occurrence of the protuberance becomes one-sided to fail to perform a uniform solid development. A slip-out occurs or a collapse occurs without enabling reproduction of a fine image.

As a method for improving the above matters, a method has been proposed, as disclosed in Japanese Patent Laid-Open No. Hei 1-209467 (1989), in which fine ink droplets are independently formed on an ink applicator to an extent that can achieve a desired resolution in advance.

However, the lesser the quantity of ink, the smaller the quantity of internal charges. Therefore, the Coulomb force resulting from the induction charge is hard to obtain, and a large developing electric field is necessary to perform development. The void between the ink applicator and the electrostatic latent image carrier has to be provided to a degree (actually, 50 $\mu$m or more) in terms of actual precision. Therefore, there occurs a limit in magnitude of the developing electric field, and when liquid droplets are too small, the development itself is difficult and the higher resolution is difficult accordingly.

As described above, the selective developing method involves many essential problems. It is scarce in reality for constituting an image forming apparatus for forming an image of high quality by employing the selective developing method.

Next, the wet developing method will be described.

The wet developing method is a developing method in which the wettability to ink is changed by an external force so that an image portion has an ink-philic property and a non-image portion has an ink repellency, and the ink is deposited on only the image portion by being wetted by the ink for development. For example, Japanese Patent Publication No. Sho 39-4299 (1964) proposes a developing method for changing the wettability at a charge portion and an exposure portion.

This developing method is simple in construction, enabling miniaturization and lower cost but the high speediness is not verified.

In the employment of the wet developing method, it is difficult to form an image making use of only the wettability unless a difference in contact angle with respect to ink between an image portion and a non-image portion is 90 degrees or more. However, under the actual circumstances, material which exhibits the change of wettability by being applied with an external force is not present in reality. Further, even if this condition should be fulfilled, when an image of high resolution is formed, a "collapse" of an image caused by the ink connection of adjacent pixels occurs, making it difficult to realize an image of high resolution.

As described above, the image forming apparatus employing the wet developing method is also scarce in reality.

Now, the two-stage developing method will be described. FIG. 10 is a schematic structural view of the image forming apparatus employing the two-stage developing method.

This image forming apparatus is provided with a photosensitive drum 1 which rotates in a direction of arrow A capable of carrying an electrostatic latent image. The surface of the photosensitive drum 1 is uniformly charged by a scorotron 2, and the surface is exposed by an exposure light 11 carrying image information whereby an electrostatic latent image is formed on the surface of the photosensitive drum 1. Thereafter, as shown in Japanese Patent Publication No. Sho 45-13274 (1970), by a first stage developing apparatus 18, an electrostatic latent image is negative-developed by an ink repellent material to form a convex portion on a non-image portion. Then, by a second stage developing apparatus 19, ink is supplied to the photosensitive drum 1 to hold the ink in a concave portion (an image portion) for development.

After the development, a recording sheet 9 is supplied, and the ink held in the concave portion (image portion) is transferred to the recording sheet 9 to form an ink image on the recording sheet 9. Thereafter, the surface of the photosensitive drum 1 is cleaned by a cleaning device 6. A discharge is carried out by an erase lamp 7. Charging for forming a next image is carried out by the scorotron 2.

In addition to the above-described system for performing the negative development in the first stage, the two-stage developing method includes a further system, as disclosed in Japanese Patent Laid-Open No. Sho 49-53046 (1974), in which in the first stage developing apparatus 18, a positive development is carried out by an ink-philic material to constitute a convex portion, and thereafter, in the second developing apparatus 19, ink is supplied to be held in the convex portion for development.

In either developing system out of these two kinds of developing systems, the first stage developing apparatus 18 is of the electrophotography, which therefore can achieve high speediness and high resolution. The second stage developing apparatus 19 relates to an ink coating step, which therefore has high speediness. Moreover, since a resolving power is defined in the first stage developed image, a high resolution can be obtained.

However, actually, since this is basically an image forming method applying the wettability, in the case where an image of high resolution is output similar to the wet developing method, a collapse caused by the ink connection of adjacent pixels occurs, making it difficult to realize a high resolution.

Further, even if either method out of these two-stage developing methods should be employed, in the case where the first stage developing apparatus 18 performs development with solid particles, when a water ink is used in the second stage developing apparatus 19, an electrostatic latent image disappears. Therefore, the first stage developed image cannot be maintained, making it difficult to form an image.

On the other hand, in the case where the first stage developing apparatus 18 performs development with a liquid, a solvent liquid is to be used as said liquid. With this, however, the intended object which will suffice not to use a solvent developer cannot be achieved. If a water ink can be used in the first stage, the two-stage development has no meaning.

As described above, it is difficult for prior arts proposed so far to form an image of high speed and high quality (particularly, a high resolving power) using a water ink.

SUMMARY OF THE INVENTION

In view of the foregoing, the present invention has its object to provide an image forming method and an image forming apparatus for carrying out said image forming method, which can use a water ink and which can form an image of high quality.

For achieving the aforementioned object, according to one aspect of the present invention, there is provided an image forming method comprising: a particle image forming step for forming a particle image in a deposited pattern of particles; an ink supplying step for supplying ink to the particle image to hold the ink in a void portion between the particles of the particle image; and an ink transfer step for transferring the ink supplied to the particle image to an object.

Preferably, the particle image forming step includes an electrostatic latent image forming step for forming an electrostatic latent image on a support capable of carrying the electrostatic latent image; and a developing step for supplying a particle developer to the electrostatic latent image formed on the support to develop the electrostatic latent image, thereby forming the particle image on the support.

In this case, the electrostatic latent image forming step may comprise a charging step for charging the support; and an exposing step for irradiating light carrying image information to the charged support to thereby form the electrostatic latent image on the support.

Further, the latent image forming step may be of a step for pouring a charge in a pattern corresponding to the image information on the support.

Preferably, the particle image forming step comprises: a magnetic latent image forming step for forming a magnetic latent image on the support capable of carrying the magnetic latent image; and a developing step for supplying magnetic particles to the magnetic latent image formed on the support to develop the magnetic latent image thereby forming a particle image on the support.

Further, the particle image forming step may be of a step for flying, onto a predetermined support, material to be deposited as particles on the support to thereby form a particle image in a deposited pattern of particles on the support.

The particle image forming step may comprise a particle image fixing step for fixing the particle image formed on the support to the support.

In this case, as the aforesaid support, a support having a tackiness for bonding the particle image may be used. The particle image fixing step may be of a step for fixing the particle image formed on the support by pressing the particle image. Or, the particle image fixing step may be of a step for heating the particle image formed on the support to fuse a surface layer of the particles of the particle image to fix the particle image on the support.

Further, preferably the particle image forming step comprises a particle image transfer fixing step for transferring the particle image formed on the support to a predetermined particle image object to fix the particle image on the particle image object.

In this case, as the aforesaid particle image object, a particle image object having a tackiness for bonding the particle image may be used. The particle image transfer fixing step may be of a step for transferring with pressing the particle image formed on the support on the particle image object to fix the particle image on the particle image object.

Further, preferably, the above-described image forming method according to the present invention comprises a cleaning step for removing particles deposited on the support from the support.

Further, in the above-described image forming method according to the present invention, the ink supplying step preferably comprises an unnecessary ink removing step for removing ink supplied to portions other than the void portion between the particles of the particle image.

Further, for achieving the aforementioned object, according to another aspect of the present invention, there is provided an image forming apparatus comprising: a particle image forming means for forming a particle image in a deposited pattern of particles; an ink supplying means for supplying ink to the particle image to hold the ink in a void portion between the particles of the particle image; and an ink transfer means for transferring the ink supplied to the particle image to an object.

The above-described image forming apparatus according to the present invention may use an electrostatic latent image in forming a particle image.

Out of the image forming apparatuses according to the present invention thus constructed, a first image forming apparatus comprises: a support capable of carrying an electrostatic latent image; an electrostatic latent image forming means for forming the electrostatic latent image on the support; a developing means for supplying a particle developer to the electrostatic latent image formed on the support to develop the electrostatic latent image thereby forming a particle image on the support; a particle image fixing means for fixing the particle image formed on the support on the support; an ink supplying means for supplying ink to the particle image fixed on the support to hold the ink in a void portion between the particles of the particle image; an ink transfer means for transferring the ink supplied to the particle image to an object; and a cleaning means for removing particles deposited on the support after the ink has been transferred to the object by the ink transfer means from the support.

Further, a second image forming apparatus provided with the construction which uses the electrostatic latent image comprises: a support capable of carrying an electrostatic latent image; an electrostatic latent image forming means for forming the electrostatic latent image on the support; a developing means for supplying a particle developer to the electrostatic latent image formed on the support to develop the electrostatic latent image thereby forming a particle image on the support; a particle image transferring and fixing means for transferring the particle image formed on the support to a predetermined particle image object to fix the particle image on the particle image object; an ink supplying means for supplying ink to the particle image fixed on the particle image object to hold the ink in a void portion between the particles of the particle image; and an ink transfer means for transferring the ink supplied to the particle image to the object.

Preferably, the second image forming apparatus comprises a cleaning means for removing particles remaining on the support after the particle image has been transferred to the particle image object by the particle image transferring and fixing means from the support.

In the image forming method and the image forming apparatus according to the present invention, the particle image is fixed to the support or the particle image object while maintaining the shape of the particles of the particle image, the ink is held in the void portion between the particles of the particle image making use of a capillarity, and the thus held ink is transferred to the object to thereby form an image obtained by the ink on the object.

The particle image need be fixed to the support or the particle image object, but in the case where the particle image is fixed even if the step for fixing the particle image is not particularly provided, there can be remained as it is. Or, the step for fixing the particle image can be provided. However, there is not employed a method for fusing particles for fixing as in the fixing of a toner image in the conventional electrophotography. Even in the case where the particles are fused and fixed, only the surface layer of the particles is fused, and fixing is made while maintaining the shape of the particles.

According to the greatest feature of the present invention, a particle image fixed while maintaining the shape of the particles is formed. Thereby, the ink is held between the particles of the particle image making use of a capillarity to transfer the ink.

In the present invention, in forming a fixed particle image, any of a system making use of an electrostatic latent image, a system making use of a magnetic latent image or a system for flying material to be bonded as particles to a support to form a particle image on the support, as described above, can be employed, or any particle image forming system other than the above systems can be employed.

Further, materials for various members in the present invention are selected so as to exhibit the above-described feature. For example, for a support or a surface of a particle image object to which a particle image is fixed, those having an ink repellency in which ink is not deposited as less as possible are preferably employed. For particles and ink forming a particle image, material having a quality in which ink tends to be held between particles are selected.

According to the present invention, a particle image of high resolution equal to that of the conventional electrophotography, magnetic photographic system and the like can be formed. Since ink is held in a void portion between particles of a particle image for transfer, the particles are connected by ink and smoothing of edge portions can be carried out to form an image of extremely high quality equal to that of the conventional wet development. Further, according to the present invention, the high speediness equal to the conventional electrophotography or the like can be obtained. As ink, a water ink can be used, and the adaptability with respect to the water ink is provided.

DESCRIPTION OF THE PREFERRED EMBODIMENTS

Preferred embodiments of the present invention will be described hereinafter with reference to the drawings.

FIG. 1 is a schematic view showing the steps in one mode of embodiment of an image forming method according to the present invention. Various steps are employed in a typical embodiment of the image forming method according to the present invention. Another embodiments of the image forming method according to the present invention are shown in modes of an image forming apparatus shown after FIG. 2.

Figure 10:
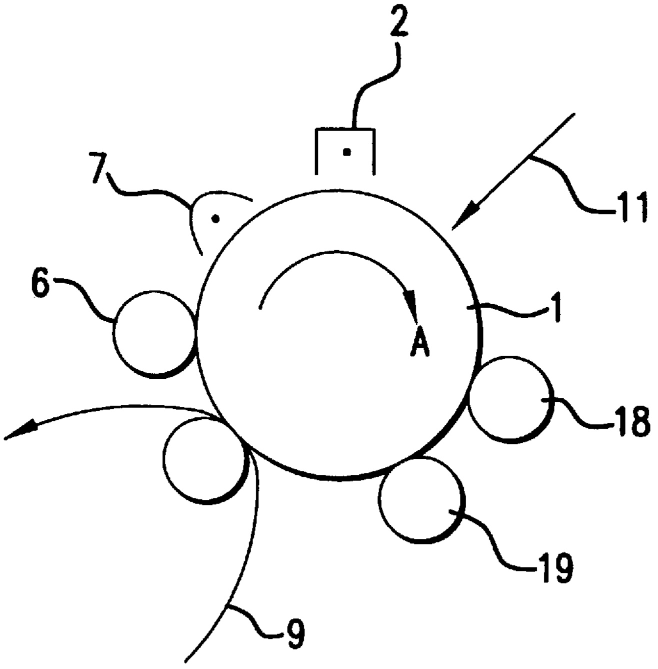
FIG. 10 is a schematic structural view of an image forming apparatus employing a two-stage developing method.

In the image forming method in the mode of embodiment shown in FIG. 1, first, an electrostatic latent image 21 is formed on a latent image carrier 20 (one example of a support in the present invention; for example, the photosensitive drum 1 shown in FIG. 10 as previously mentioned) capable of carrying an electrostatic latent image (A).

Next, the electrostatic latent image 21 is developed by solid particles to form a particle image 22 on the support 20 (B).

Then, the image is transferred and fixed to a tacky film 23 (one example of a particle image object in the present invention) whose surface has an ink repellency (C and D).

Thence, a colored ink 24 is supplied to the tacky film 23 to be held in only a void portion between the particles of the particle image 22 of the tacky film 23 (E). A recording sheet 25 (one example of an object in the present invention) is brought into contact with the tacky film 23 to which is supplied the colored ink 24 (F). The colored ink 24 held on the particle image 22 is transferred to the recording sheet 25 (G). Thereby, an image obtained by the colored ink 24 is formed on the recording sheet 25.

In the image forming method shown in FIG. 1, the process till the particle image 22 is formed on the latent image carrier 20 is similar to that of the conventional electrophotography and therefore has the high speediness. By using small particles as solid particles, it is possible to form a particle image of high resolution. Rewriting of the particle image can be done at high speed.

The solid particles are not particularly limited in material, constitution, shape and the like as long as ink can be permeated into the void between the particles. However, since the image forming method shown in FIG. 1 uses an electrostatic latent image, it is necessary that electrostatic development can be done. For example, if the ink can be permeated into the void between the particles, a normal electronic photographic toner can be used. The size of the solid particles used is 0.5 $\mu$m to 20 $\mu$m in diameter, more preferably, 1 $\mu$m to 15 $\mu$m in diameter, in terms of the retainable ink quantity and resolving power. However, these are not limited the aforesaid range according to the desired resolving power and the like.

The solid particle image formed by the development is transferred to the tacky film 23 whose surface has an ink repellency, and the solid particles are fixed to the tacky film 23. In the present embodiment, however, the solid particle image is fixed on the tacky film 23 by adhesion while the void remains formed between the particles without change in shape of particles. The filling rate of solid particles in case of adhesion and fixing was 20 to 30% when solid particles having an average particle diameter of 7 $\mu$m are used, according to the measurement made by the present inventors.

A liquid has properties that when the liquid comes in contact with a solid having a void or hole, the liquid is permeated and held in the void or hole of the solid due to the wet with the surface of the solid and the capillarity. When a contact angle of liquid to solid is 90 degrees or less, this phenomenon very quickly progresses.

Since the capillarity naturally progresses as the liquid comes in contact with the solid, when the ink 24 is supplied to the tacky film 23 to which is fixed the solid particle image 22, the ink 24 is naturally absorbed into the void formed by the particle image 22, and an ink image having the same pattern as that of the particle image is formed.

The liquid once moved into the void is held in the void and is hard to be flown out. Even if an external force to some degree is applied, no outflow of liquid held in the void occurs though depending on the wettability with the liquid on the solid surface, the size of the void, the surface tension and viscosity of the liquid.

Further, since the surface of the tacky film 23 is ink repellent, ink is hard to be deposited on the non-image portion. Particularly, if the ink repellency of the ink 24 is high (for example, if the contact angle between the tacky film 23 and the ink 24 is 100 degrees or more), the ink 24 is not deposited on the non-image portion.

Further, since the ink held in the void of the solid particle image 22 does not flow out unless the external force in excess of a certain degree, even if unnecessary ink of the non-image portion by air blowing or non-contact reverse roll is removed and unnecessary ink by a blade or the like is removed, an ink image held in the void of the solid particle image is not disturbed, and the ink remaining on the non-image portion can be mechanically effectively removed. Accordingly, if the surface has an ink repellency to some degree, it can be used as the tacky film 23 in the present embodiment.

The ink 24 held on the solid particle image 22 can be transferred due to the capillarity by applying pressure to the recording sheet 25 to bring it into contact therewith. Alternatively, a conveying and support member of the tacky film 23 and a support member of the recording sheet 25 are made to be applied with a bias voltage whereby a transfer by means of an electrostatic attraction or they can be combined for transfer. Since the solid particle image 23 is easily and firmly secured to the tacky film 23, when the ink 23 is transferred, the solid particle image 22 is prevented from being transferred along with the ink 24.

The particle image 22 secured to the tacky film 23 is reusable, a plurality of the same ink images can be formed. Supplying of ink 24 and transferring of ink 24 can be repeated. Since processes such as image formation and development by solid particles can be omitted, higher speediness can be attained, which leads to a longer service life of the latent image carrier 20 and a reduction in quantity of use of solid particles.

Further, when the ink 24 is transferred, even if pressure is applied, the solid particles function as a spacer. Therefore, a collapse or flying of an ink image can be prevented.

In the present embodiment, since holding of ink applies a capillarity, any ink as long as it is liquid (liquid or fluid) can be used. For example, a general water ink may be used. Or, use can be made of an ink in which a developer having toner dispersed into a carrier liquid, generally called a two-component liquid developer, toner being subjected to electrophoresis in a carrier liquid, or an ink generally called a single component liquid developer in which colored particles are dispersed in a liquid or fluid but colored particles are not moved in the liquid or fluid as in the electrophoresis phenomenon, or an insulating and conductive ink. Further, use can be made of a solid ink if it can be liquid when ink is supplied or ink is transferred.

Figure 1A:
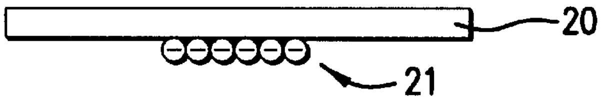
FIG. 1 is a schematic view showing the steps in one mode of embodiment of an image forming method according to the present invention.
Figure 1B:
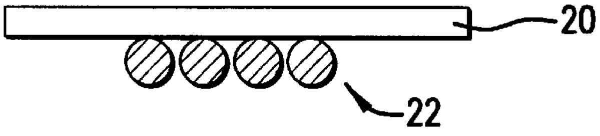
Figure 1C:
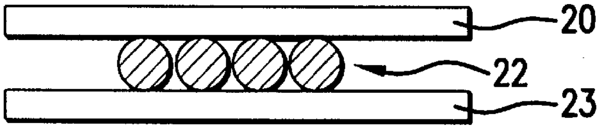
Figure 1D:
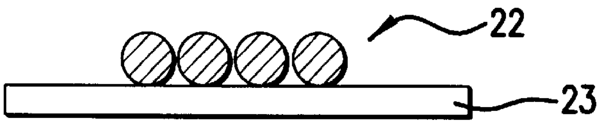
Figure 1E:
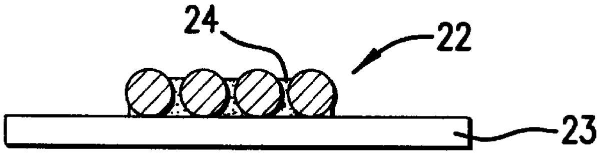
Figure 1F:
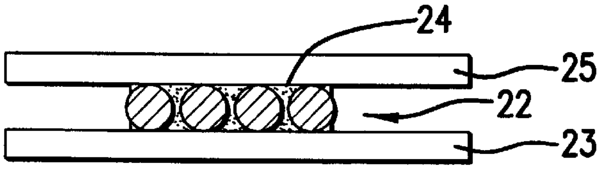
Figure 1G:
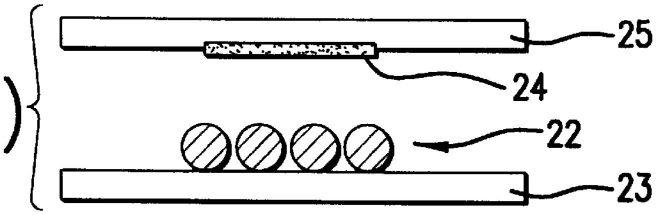
Figure 2:
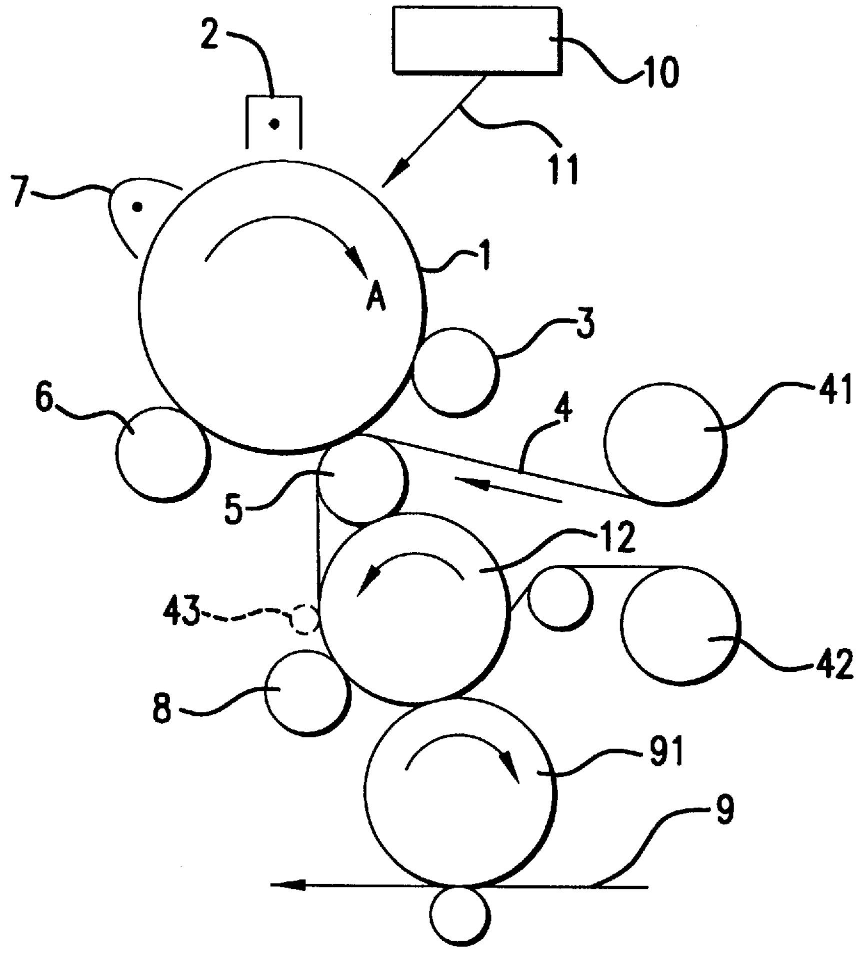
FIG. 2 is a schematic structural view showing one mode of embodiment of an image forming apparatus according to the present invention.

FIG. 2 is a schematic structural view showing one mode of embodiment of an image forming apparatus according to the present invention.

In the image forming apparatus according to the present embodiment, around an amorphous silicon photosensitive drum 1 as an electrostatic latent image carrier are arranged a charged scorotron 2, a dry developing unit 3, a tacky film 4, a press roll 5, a cleaning unit 6 and an erase lamp 7. The tacky film 4 is wound around a feed roll 41. The tacky film 4 is delivered out of the feed roll 41, is pressed on the photosensitive drum 1 by the press roll 5, is supported on a support roll 12, and is wound on a winding roll 42. In the present embodiment, the tacky film 4 is one example of a particle image object in the present invention. In the conveying channel of the tacky film 24 are arranged a liquid developing unit 8 for supplying a water ink, and an intermediate transfer drum 91.

The photosensitive drum 1 is rotated in a direction indicated by arrow A in the figure by means of a driving device not shown. The surface of the photosensitive drum 1 is uniformed charged by the charging scorotron 2. The thus charged photosensitive drum 1 is exposed an exposure laser beam 11 carrying image information released from a laser ROS 10 (Raster Output Scanner) to form an electrostatic latent image. The photosensitive drum 1 formed with the electrostatic latent image is developed with solid particles by the dry developing unit 3.

While in this embodiment, the amorphous silicone photosensitive drum 1 is used as an electrostatic latent image carrier, it is to be noted that the electrostatic latent image carrier is not limited thereto but a suitable photosensitive body, a dielectric drum or a belt which can withstand ink to be used can be used.

Solid particles that can be used include those which can be charged with high resistance or those which can be electrostatically developed by a dielectric charge in an electric field. There is no limitation in size, shape, material and configuration. Preferably, however, the surface characteristics of the solid particles are that a contact angle with the ink used is 90 degrees or less.

In the present embodiment, toner particles used in general dry electronic photography fulfilled with the above conditions are used. The toner particles used in the present embodiment has 70 to 80 degrees of a contact angle, and 5 to 7 μm of particle diameter.

As the dry developing unit 3, a developing unit employing various developing method used in a general dry electronic photography can be used. In the present embodiment, however, a developing unit employing a two-component dry developing method in which toner particles are held on magnetic carrier particles held on a magnetic roll and placed close to or in contact with an electrostatic latent image for development.

A toner particle image formed on the photosensitive drum 1 is transferred to the tacky film 4, and after this, the photosensitive drum 1 is removed in residual toner by the cleaning unit 6, and removed in light by the erase lamp 7 to ready for next image formation.

In the description of the present embodiment, films, sheets or tapes having a tackiness formed in the surface with a tackifier layer generally called the tacky films.

If the tacky film 4 has an ink repellency and an ink resistance with respect to the ink used, general tacky films can be used. In the present embodiment, a water ink used as ink. Therefore, a tacky film coated with an acrylic or silicone tackifier is suitable but other tacky films can be also used. A contact angle of the acrylic tacky film used in the present embodiment to the water ink is about 80 degrees, and a contact angle of the silicone tacky film to the water ink is about 90 degrees.

In the present embodiment, the tacky film 4 is prepared in the state where it is wound around the feed roll 41 and conveyed in the illustrated channel. The tacky film 4 is pressed, from its back, against the photosensitive drum 1 by the elastic press roll 5. The press roll 5 is supported movably to and from and separated from the photosensitive drum 1 at the time other than adhesion or transfer. When a plurality of the same images are formed, the tacky film 4 is cut to a predetermined length and wound around the support drum 12 for repeated use by times as desired.

As a method for transferring a particle image to the tacky film 4, pressure transfer or other electrostatic transfer may be used. However, preferably, pressure is applied in order to enhance an adhesive force between the tacky film 4 an the particle image.

In the present embodiment, as the tacky film 4, a heat sensitive tacky film may be used. Since the heat sensitive tacky film is low in tackiness at a temperature of room temperature or so, the tacky film can be easily conveyed. When the particle image is transferred to the tacky film, a mechanical load caused by adhesion to or stripping from the surface of the photosensitive drum 1 can be reduced to prevent the photosensitive drum 1 from being deteriorated.

In the case where a normal tacky film is used, there possibly occurs a trouble such that a tackifier becomes slightly deposited on the surface of the photosensitive drum 1. However, when the heat sensitive tacky film is used, no trouble occurs.

In the case where the heat sensitive tacky film is used, it is low in tackiness at a room temperature or so but a toner particle image is well transferred. However, when it is used at an extremely low temperature, poor transfer possibly occurs. Therefore, an electrostatic transfer may be simultaneously carried out auxiliarily. In the case where a heat sensitive tacky film is used, before arrival at the liquid developing unit 8 after the toner particle image has been transferred, the heat sensitive tacky film 4 is heated by the heating roll 43 whereby a sufficient tackiness is imparted to the tacky film so that the particle image is secured to the tacky film with sufficient strength.

A water ink is supplied to the tacky film 4 to which a toner particle image is transferred by the liquid developing unit 8. As the water ink, those in which various commercially available water coatings are diluted with water and those in which fine (1 μm or less of particle diameter) pigments are dispersed into water can be used.

The liquid developing unit 8 is not particularly limited in configuration as long as the water ink can be supplied to the whole surface of the tacky film 4. In the present embodiment, however, a liquid developing unit having a configuration shown in FIG. 3 is employed.

Figure 3:
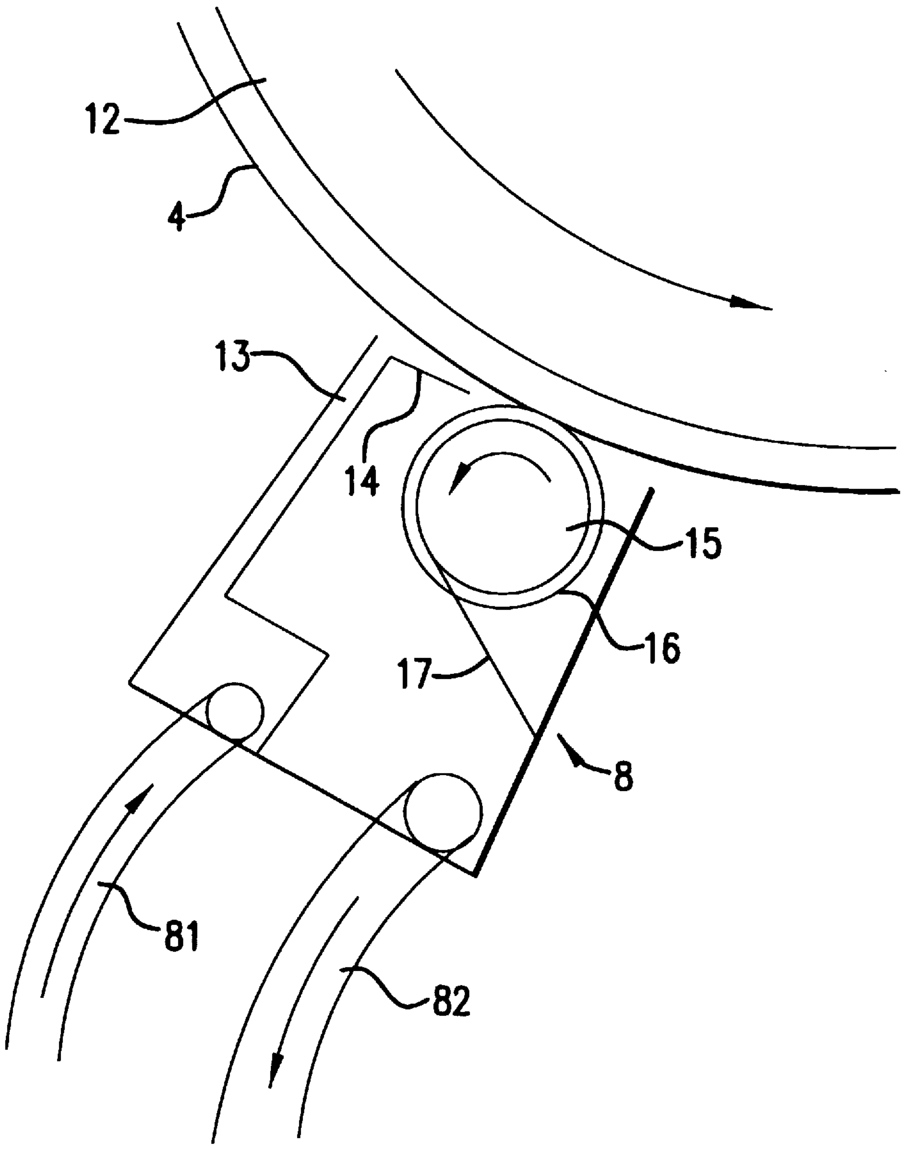
FIG. 3 is a schematic structural view showing one example of a liquid developing apparatus.

In the liquid developing unit 8 shown in FIG. 3, a water ink passed through an ink supply pipe 81 is supplied from a slit nozzle 13 to a plate 14 disposed close to the tacky film 4 to fill the water ink between the tacky film 4 and the plate 14, whereby the water ink is supplied to the surface of the tacky film 4.

The water ink supplied is quickly absorbed in the void of the particles of a particle image. The tacky film 4 used in the present embodiment is high in ink repellency with respect to the water ink so that ink rarely remains on the non-image portion. However, in the case where a spacing in the image portion is small, ink possibly unnecessarily remains between adjacent pixels though depending on the characteristics of ink such as the surface tension and the viscosity. Therefore, a roll member 15 is provided on the liquid developing unit.

A predetermined gap is formed between the roll member 15 and the tacky film 4. This gap is maintained by bringing tracking rolls 16 rotatably mounted on both ends of the roll member 15 into contact with the end of the support drum 12. The roll member rotates in the direction opposite to the conveying direction of the tacky film 4 to remove unnecessary ink making use of viscosity of ink. The ink deposited on the roll member 15 is scraped off by a scraper 17 and is recovered through an ink recovery pipe 82.

By the provision of such an unnecessary ink removing means, the unnecessary ink can be well removed without outflow of ink held on the particle image and an ink image of high resolution is formed.

The unnecessary ink removing means employed include, other than the use of the above-described roll member 15, means for spraying air against the surface of the tacky film from an air nozzle or means for placing an elastic blade into contact with the tacky film to remove unnecessary ink.

Further, the liquid developing unit itself also includes, other than the liquid developing unit shown in FIG. 2, various units such as a liquid developing unit of a roll type in which ink is deposited on the surface of a roll disposed close to the tacky film 4 and rotated to supply ink to the tacky film 4, and a unit of a sponge type in which ink is adsorbed on an ink absorbing member to bring the ink absorbing member into contact with the tacky film 4 to supply ink.

As shown in FIG. 2, the ink supplied to the tacky film 4 is once transferred from the tacky film 4 to an intermediate transfer drum 91 and further transferred to a recording sheet 9. In the present embodiment, when in transfer to the intermediate transfer drum 91, an electrostatic transfer is principally employed, and when in transfer to the recording sheet 9, a press transfer is employed. When an ink image is transferred from the tacky film 4 to the intermediate transfer drum 91, a particle image is positively held on the tacky film 4 to prevent the particles from being transferred to the intermediate transfer drum 91.

The ink image can be directly transferred to the recording sheet 9 from the tacky film 4. However, preferably, an intermediate transfer drum 91 formed of material which is hard to be deposited on the tacky film 4 is employed in order to avoid a trouble such that the recording sheet 9 becomes deposited on the tacky film 4.

Figure 4:
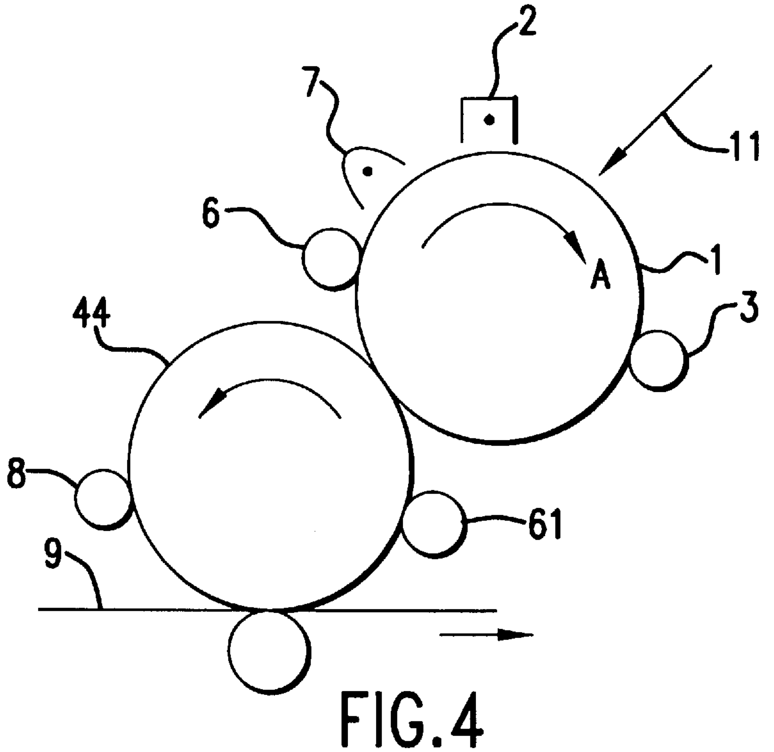
FIG. 4 is a schematic structural view showing another mode of embodiment of an image forming apparatus according to the present invention.

FIG. 4 is a schematic structural view showing another mode of embodiment of an image forming apparatus according to the present invention. Constituent parts similar to those in the embodiment shown in FIG. 2 are indicated by the same reference numerals as those shown in FIG. 2, and a duplicate description will be omitted.

A particle image formed on the photosensitive drum 1 is transferred to an intermediate transfer roll 44 having a tackiness (one example of the particle image object in the present invention) and fixed to the intermediate transfer roll 44 due to the tackiness thereof. Water ink is supplied to the particle image secured to the intermediate transfer roll 44 by the liquid developing unit 8, and an ink image thereof is transferred to the recording sheet 9. The particle image on the intermediate transfer roll 44 is removed from the surface of the intermediate transfer roll 4 by a cleaning unit 61.

As described above, the particle image object in the present invention is not limited to a film-like object as shown in FIG. 2, but a roll-like or a drum-like shown in the figure or an endless belt-like not shown can be employed.

Figure 5:
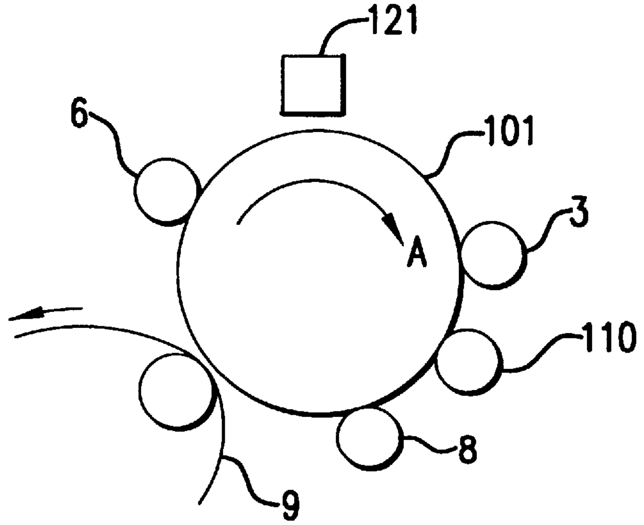
FIG. 5 is a schematic structural view showing a mode of embodiment of an ionography system.

FIG. 5 is a schematic structural view showing a mode of embodiment of an ionography system.

This apparatus is provided with a dielectric drum 101 formed on a conductive substrate surface with a dielectric layer, as one example of the support in the present invention. The dielectric drum 101 is applied on the surface with a tackiness with respect to solid particles supplied by the dry developing unit 3 and with an ink repellency.

The dielectric drum 101 is formed on the surface with an electrostatic latent image by an ionohead 121. The ionohead 121 is provided with a charge generation means making use of, for example, corona discharge or edgewise discharge, and a slit-like field control means. A ground potential or an adequate bias potential is applied to a substrate of the dielectric drum 101. A charge generated by the charge generation means of the ionohead 121 is poured onto the surface of the dielectric drum 101 by an electric field according to image information formed between the electric field control means and the dielectric drum 101 to form an electrostatic latent image on the surface of the dielectric drum 101.

The dielectric drum 101 rotates in a direction indicated by arrow A, and solid particles are supplied to an electrostatic latent image formed on the surface thereof by the dry developing unit 3 to form a particle image thereat. This particle image is pressed on the dielectric drum 101 by adequate pressure by a press roll 110 thereby being adhered and secured to the surface of the dielectric drum 101.

A water ink is supplied to the particle image secured onto the dielectric drum 101 by the liquid developing unit 8, and an ink image is transferred to the recording sheet 9. Thereafter, the dielectric drum 101 is removed in the particle image on the surface thereof by the cleaning unit 6.

While here, a description has been made to the effect that the tackiness is imparted to the surface of the dielectric drum 101, it is to be noted that instead, the aforesaid surface is formed from a hard layer without or less tackiness, and a heating roll is disposed in place of the press roll 110 so that only the surface layer portion of solid particles forming a particle image is fused by heat supplied from the heating roll to deposit it on the dielectric drum 101 whereby the particle image may be secured to the dielectric drum 101.

At this time, the solid particles are formed of material which tend to be fused into only the surface layer portion, or solid particles formed of uniform material are used, and a quantity of heat to be supplied to the heating roll is adjusted to a degree that only the surface layer portion of the solid particles is fused.

In the measurement according to the present invention, in the case of heating and fixing, the filling rate of the solid particles when solid particles having 7 $\mu$m of average particle diameter are used is 25 to 40%, which is slightly higher than that of adhesion and fixing (20 to 30%) but a void which is sufficient in practical use has been secured. Deformation (change in a ratio of longitudinal to lateral) at the time of heating and fixing is 35% or less, and also in the case of heating and fixing, there was sufficient granular properties.

As described above, even in the case where an electrostatic latent image is used in the present invention, the electrostatic latent image can be directly written as in this embodiment not limiting to a so-called electronic photography system in which a partial discharge is carried out after uniform charge to form an electrostatic latent image. Further, in this example, the particle image is secured to the dielectric drum 101 as the support in the present invention, and an ink image is directly transferred to the recording sheet without an intermediate transfer.

Figure 6:
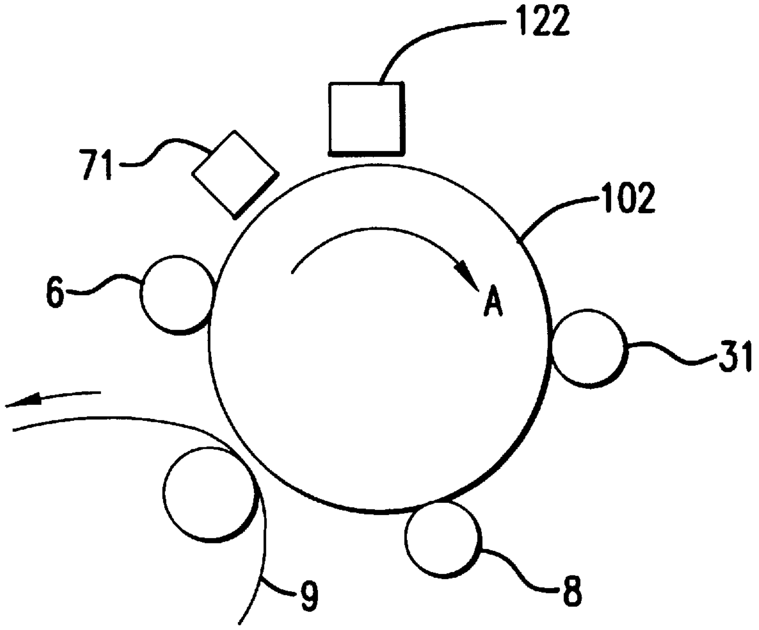
FIG. 6 is a schematic structural view showing a mode of embodiment of a magnetic photographic system.

FIG. 6 is a schematic structural view showing a mode of embodiment of a magnetic photographic system. This apparatus is provided with a magnetic drum 102 provided on the surface with a magnetic layer as one example of the support in the present invention. The surface of the magnetic drum 102 is imparted with an ink repellency. The magnetic layer is similar to a magnetic layer of a general magnetic tape. For example, ferromagnetic powder such as magnetite and ferrite is dispersed into a binder and coated on the substrate surface of the drum, or a metal film is formed on the substrate surface by vapor deposition, sputtering, plating or the like for use.

On the magnetic layer on the surface of the magnetic drum 102 is written a magnetic latent image according to image information by a magnetic head 122. The magnetic head 122 that can be employed includes, for example, a system in which a current is caused to flow into a coil to impart a strong magnetic flux to the magnetic layer of the magnetic drum 102, and a system in which a heat generation element or a laser is used to erase or invert magnetization of the magnetic layer originally magnetized. Here, a system in which a demagnetized magnetic layer is magnetized is employed.

The magnetic drum 102 rotates in a direction as indicated by arrow A. Magnetic solid particles are supplied to a magnetic developing unit 31 to develop a magnetic latent image, and a particle image formed of the solid particles is formed.

The magnetic developing device 31 that can be employed includes, for example, a system in which magnetic particles are held magnetically and in a brush-like manner on a rotating magnet sleeve, and the held magnetic particles are brought into contact with the magnetic drum 102 or closely opposed thereto.

A particle image thus formed on the magnetic drum 102 is secured to the surface of the magnetic drum 102 by a magnetic force without special fixing means. When the fixing force is not sufficient, the tackiness is applied to the surface of the magnetic drum 102, similar to the embodiment shown in FIG. 5, and the particle image is pressed on the magnetic drum 102, or only the surface layer of solid particles constituting a particle image is fused whereby the particle image can be secured to the magnetic drum 102. Alternatively, as in the embodiments shown in FIGS. 2 and 4, the particle image is transferred to a film-like or roll-like particle image object so that the particle image can be secured to the particle image object.

In the embodiment shown in FIG. 6, the particle image is secured to the magnetic drum 102 by the magnetic force, and the water ink is supplied to the particle image by the liquid developing unit 8 to transfer an ink image to the recording sheet 9. The particle image after transfer of the ink image is removed by the cleaning unit 6, and the magnetic drum 102 is demagnetized by a demagnetizer 71 to ready for next image formation. If in cleaning, it is necessary to be demagnetized already, the cleaning unit 6 and the demagnetizer 71 are arranged in order reversed to that shown in FIG. 6.

Figure 7:
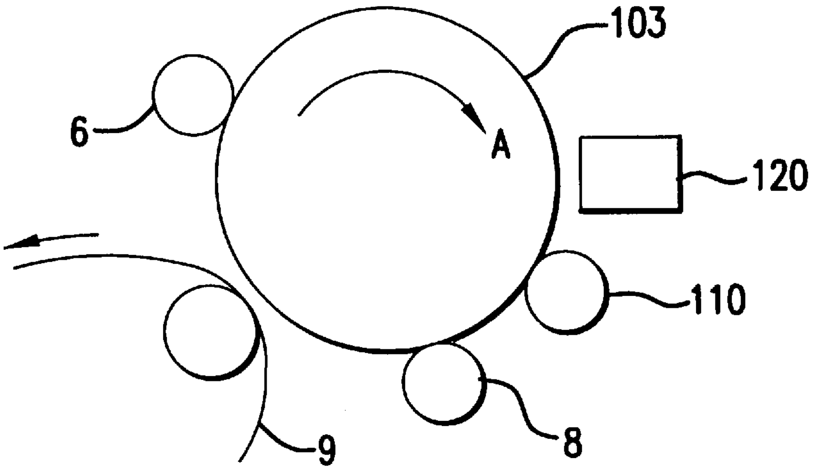
FIG. 7 is a schematic structural view showing a mode of embodiment of a solid particle flying system.

FIG. 7 is a schematic structural view showing a mode of embodiment of a solid particle flying system. Solid particles are flied according to image information on a tacky rotary drum 103 which rotates in a direction indicated by arrow A by a particle image forming apparatus 120 so that a particle image is formed on the rotary drum 103.

Figure 8:
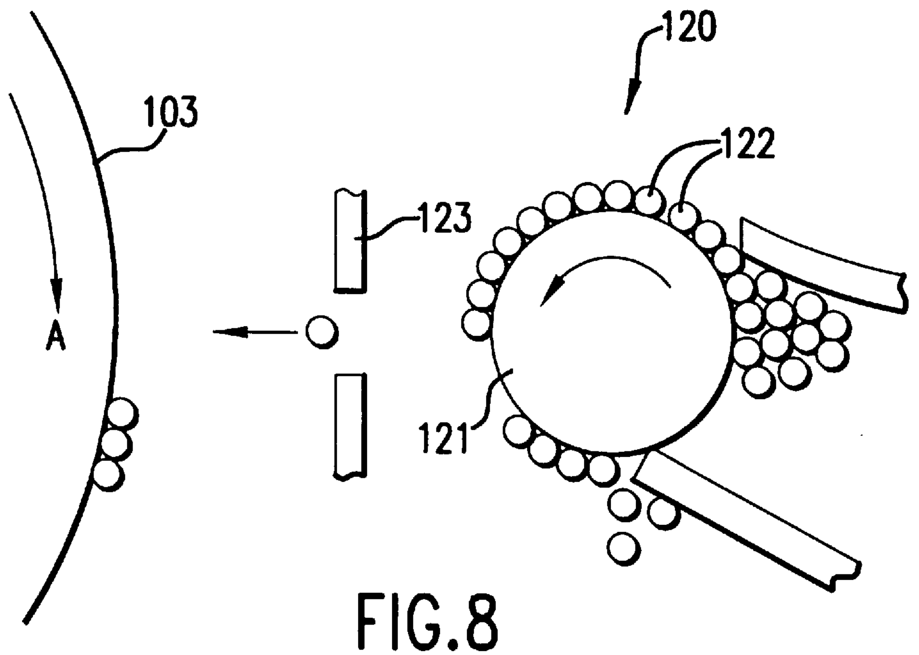
FIG. 8 is a schematic structural view of a particle image forming apparatus.

FIG. 8 is a schematic structural view of a particle image forming apparatus. There is provided a charged particle supply roll 121. Charged solid particles are conveyed by the charged particle supply roll 121 to a position opposed to a rotary drum 103. A control electrode 123 is arranged between the charged particle supply roll 121 and the rotary drum 103, and a control voltage according to image information is applied to the control electrode 123. On the other hand, a ground potential or an adequate bias potential is applied to a substrate of the rotary drum 103, the charged solid particles conveyed by the charged particle supply roll 121 are flied toward the rotary drum 103 according to a control voltage applied to the control electrode 123, whereby a particle image formed from solid particles is formed on the rotary drum 103.

The particle image formed on the rotary drum 103 is pressed on the rotary drum 103 by a press roll 110 and secured to the rotary drum 103 by the tackiness of the rotary drum 103.

Other constitutions are similar to those of the embodiment shown in FIG. 5, for example, and a description thereof is omitted. A particle image can be directly formed without forming a latent image, as shown in this example.

In directly forming the particle image, the particle image will suffice to be formed on the rotary drum 103. It is not always limited that solid particles are flied. For example, an ink jet system using a heating and fusing type of solid such as wax may be employed as a particle image forming apparatus to fly droplets on the rotary drum 103. The droplets are momentarily solidified on the rotary drum 103 to form a particle image. In this case, it is secured to the rotary drum 103 at the time of solidification, and accordingly, it is not necessary to impart a tackiness to the rotary drum 103, and the press roll 110 is not necessary.

Figure 9:
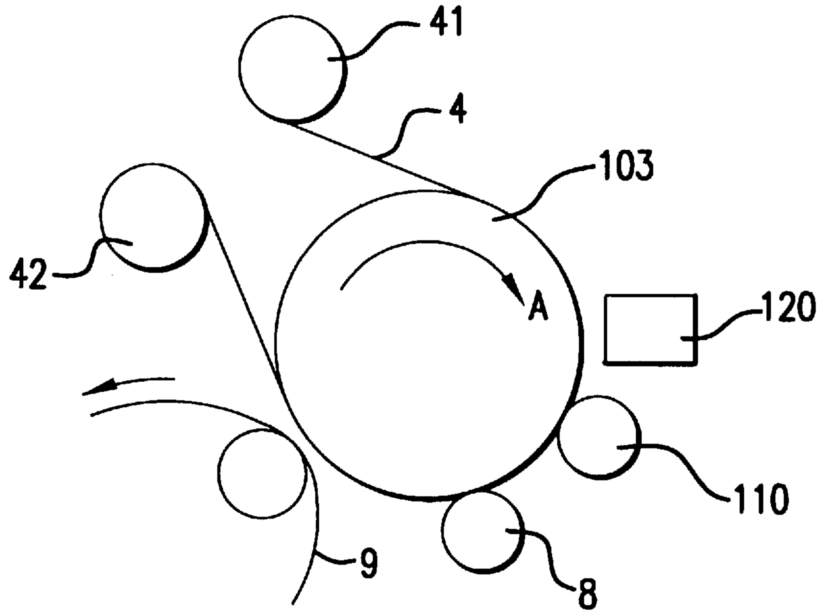
FIG. 9 is a schematic structural view showing another mode of embodiment of a solid particle flying system.

FIG. 9 is a schematic structural view showing another mode of embodiment of a solid particle flying system. The tacky film 4 wound around the feed roll 41 is wound around the rotary drum 103 and wound around the winding roll 42.

In this embodiment, a particle image is directly formed without a latent image on the tacky film 4 wound on the rotary drum 103 by a particle image forming apparatus 120. By this constitution, the durability of the rotary drum 103 can be enhanced.

As described above, according to the present invention, since development is carried out by holding ink using the capillarity of liquid, liquid ink can be used, and accordingly, a water ink can be also used.

The ink holding force by way of the capillarity is large, and even if an external force for removing unnecessary ink of the non-image portion is applied, the ink is prevented from being flown out. Therefore, the unnecessary ink of the non-image portion can be easily removed, and an image of high quality without ground contamination is obtained.

Further, in the present invention, an electronic photography or a magnetic photography can be also used. Since a solid particle image can be formed by these processes, a high-speed image formation can be made. Furthermore, in an output of the same image, it is possible to reuse a fixed particle image as a plate and a plurality of ink images can be formed merely by the steps of supplying ink and transferring ink. Therefore, higher speed can be obtained. Moreover, since a particle image of high quality is obtained using an electronic photography of a magnetic photography, an ink image of high resolution can be obtained.

What is claimed is:

1. An image forming method comprising:

a particle image forming step for forming a particle image in a deposited pattern of particles on a tacky support and fixing the deposited pattern to the tacky support by pressing without heating the deposited pattern of particles to the tacky support;

an ink supplying step for supplying ink to said particle image to hold the ink in a void portion between the particles of said particle image; and an ink transfer step for transferring the ink supplied to said particle image to an object.

2. An image forming method according to claim 1, wherein said particle image forming step includes an electrostatic latent image forming step for forming an electrostatic latent image on a support capable of carrying the electrostatic latent image; and a developing step for supplying a particle developer to the electrostatic latent image formed on said support to develop the electrostatic latent image, thereby forming the particle image on the support.

3. An image forming method according to claim 2, wherein said electrostatic latent image forming step comprises: a charging step for charging the support; and an exposing step for irradiating light carrying image information to the charged support to thereby form the electrostatic latent image on the support.

4. An image forming method according to claim 2, wherein said electrostatic latent image forming step comprises: a step for depositing a charge in a pattern corresponding to the image information on the support.

5. An image forming method according to claim 2, wherein said particle image forming step comprises a transferring the particle image to the tacky support.

6. An image forming method according to claim 2, further comprising a cleaning step for removing particles deposited on the support from said support.

7. An image forming method according to claim 1, wherein said particle image forming step comprises: a magnetic latent image forming step for forming a magnetic latent image on a support capable of carrying the magnetic latent image; and a developing step for supplying magnetic particles to the magnetic latent image formed on said support to develop said magnetic latent image thereby forming a particle image on the support.

8. An image forming method according to claim 1, wherein said ink supplying step comprises an unnecessary ink removing step for removing ink supplied to portions other than the void portion between the particles of the particle image.

9. The image forming method of claim 1, wherein said particle image forming step comprises a step for flying material to be deposited as particles on the tacky support to thereby form the particle image on the tacky support.

10. An image forming apparatus comprising:

a support capable of carrying an electrostatic latent image;

an electrostatic latent image forming means for forming an electrostatic latent image on said support;

a developing means for supplying a particle developer to the electrostatic latent image formed on the support to develop the electrostatic latent image thereby forming a particle image on the support;

a particle image transferring and fixing means for transferring the particle image formed on the support to a predetermined particle image object and fixing the particle image on the particle image object by pressing without heating the particle image onto the particle image object;

an ink supplying means for supplying ink to the particle image fixed on the particle image object to hold the ink in a void portion between the particles of the particle image; and an ink transfer means for transferring the ink supplied to the particle image to the object.

11. An image forming apparatus according to claim 10, further comprising a cleaning means for removing particles remaining on the support after the particle image has been transferred to the particle image object by said particle image transferring and fixing means from the support.

12. An image forming apparatus comprising:

particle image forming means for forming a particle image in a deposited pattern of particles on a support, and for fixing the deposited pattern of particles to the support by pressing without heating the deposited pattern to the support;

ink supplying means for supplying ink to said particle image to hold the ink in a void portion between the particles of the particle image; and ink transfer means for transferring the ink supplied to the particle image to an object.

13. An image forming apparatus comprising:

a tacky support capable of carrying an electrostatic latent image;

electrostatic latent image forming means for forming an electrostatic latent image on said tacky support;

developing means for supplying a particle developer to the electrostatic latent image formed on the tacky support to develop the electrostatic latent image, thereby forming a particle image on the tacky support;

particle image fixing means for fixing the particle image formed on the support by pressing without heating the particle image to the tacky support;

ink supplying means for supplying ink to the particle image fixed on the tacky support to hold the ink in a void portion between the particles of the particle image;

ink transfer means for transferring the ink supplied to the particle image to an object; and cleaning means for removing particles deposited on the support after the ink has been transferred to the object by the ink transfer means from the tacky support.

* * * * *